United States Patent
Garosshen et al.

(10) Patent No.: US 10,648,616 B2
(45) Date of Patent: May 12, 2020

(54) PRESSURE VESSEL ASSEMBLY AND METHOD OF FORMING

(71) Applicant: UNITED TECHNOLOGIES RESEARCH CENTER, East Hartford, CT (US)

(72) Inventors: Thomas J. Garosshen, Glastonbury, CT (US); Ellen Y. Sun, South Windsor, CT (US); Paul F. Croteau, Columbia, CT (US); Andrzej Ernest Kuczek, Bristol, CT (US); Tahany Ibrahim El-Wardany, Bloomfield, CT (US); Wenping Zhao, Glastonbury, CT (US); Justin R. Hawkes, Marlborough, CT (US); John A. Sharon, Manchester, CT (US); John P. Wesson, West Hartford, CT (US); Daniel V. Viens, Mansfield Center, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 299 days.

(21) Appl. No.: 15/517,010

(22) PCT Filed: Oct. 7, 2014

(86) PCT No.: PCT/US2014/059398
§ 371 (c)(1),
(2) Date: Apr. 5, 2017

(87) PCT Pub. No.: WO2016/057022
PCT Pub. Date: Apr. 14, 2016

(65) Prior Publication Data
US 2017/0343160 A1 Nov. 30, 2017

(51) Int. Cl.
*F17C 1/16* (2006.01)
*F17C 1/14* (2006.01)
*B23K 15/00* (2006.01)

(52) U.S. Cl.
CPC ............ *F17C 1/14* (2013.01); *B23K 15/0006* (2013.01); *F17C 1/16* (2013.01);
(Continued)

(58) Field of Classification Search
CPC ........ F17C 2201/0152; F17C 2201/056; F17C 2203/0617; F17C 2203/0643; F17C 2203/0646; F17C 2203/0663
(Continued)

(56) References Cited

U.S. PATENT DOCUMENTS

| 1,668,179 A | * | 5/1928 | Williams | .................. F17C 1/08 220/653 |
| 2,790,489 A | | 4/1957 | Denison, Jr. | |

(Continued)

FOREIGN PATENT DOCUMENTS

| CN | 105874260 A | 8/2016 |
| DE | 3026116 A1 | 2/1982 |

(Continued)

OTHER PUBLICATIONS

The second office Action from the State Intellectual property office of People's Republic of China, Publication No. 201480082575.5 (Year: 2014).*

(Continued)

*Primary Examiner* — King M Chu
(74) *Attorney, Agent, or Firm* — Cantor Colburn LLP

(57) ABSTRACT

A pressure vessel assembly includes a plurality of lobes, each lobe having at least one vertically arranged interior wall, the lobes positioned in a side by side arrangement such that a first interior wall of a first lobe is positioned adjacent (Continued)

a second interior wall of a second lobe, the first interior wall having a first wall top and bottom side, the second interior wall having a second wall top and bottom side, the first wall top side joined to the second wall top side and the first wall bottom side joined to the second wall bottom side. Also included are first and second end wall surfaces of each of the plurality of lobes. Further included is a plurality of end caps, each of the end caps joined to the end wall surfaces of the lobes, each of the end caps joined to at least one adjacent end cap.

2 Claims, 7 Drawing Sheets

(52) U.S. Cl.
CPC ............... *F17C 2201/0152* (2013.01); *F17C 2201/056* (2013.01); *F17C 2203/0617* (2013.01); *F17C 2203/0643* (2013.01); *F17C 2203/0646* (2013.01); *F17C 2203/0663* (2013.01); *F17C 2209/2181* (2013.01); *F17C 2209/221* (2013.01); *F17C 2209/222* (2013.01); *F17C 2209/225* (2013.01); *F17C 2221/012* (2013.01); *F17C 2221/031* (2013.01); *F17C 2221/033* (2013.01); *F17C 2221/035* (2013.01); *F17C 2223/0123* (2013.01); *F17C 2223/035* (2013.01); *F17C 2260/018* (2013.01); *F17C 2270/0168* (2013.01); *Y02E 60/321* (2013.01)

(58) Field of Classification Search
USPC .......................................................... 220/581
See application file for complete search history.

(56) References Cited

U.S. PATENT DOCUMENTS

| | | | |
|---|---|---|---|
| 3,012,695 A | 12/1961 | Lerner | |
| 3,319,433 A | 5/1967 | Pauliukonis et al. | |
| 5,651,474 A * | 7/1997 | Callaghan | B29C 70/088 220/565 |
| 5,787,920 A * | 8/1998 | Krasnov | B60K 15/03006 137/255 |
| 6,095,367 A * | 8/2000 | Blair | B60K 15/03006 220/581 |
| 6,227,230 B1 * | 5/2001 | Huh | B60K 15/03006 137/255 |
| 8,020,722 B2 * | 9/2011 | Richards | F17C 1/14 220/4.12 |
| 2004/0226607 A1 | 11/2004 | Hervio et al. | |
| 2014/0166664 A1 | 6/2014 | Lin et al. | |
| 2017/0299119 A1 | 10/2017 | Zhao et al. | |
| 2017/0299122 A1 | 10/2017 | Croteau | |

FOREIGN PATENT DOCUMENTS

| | | |
|---|---|---|
| EP | 1355105 A2 | 10/2003 |
| EP | 1355107 A2 | 10/2003 |
| EP | 1426673 A2 | 6/2004 |
| EP | 2354700 A1 | 8/2011 |
| FR | 2671542 A1 | 7/1992 |
| FR | 2739912 A1 | 4/1997 |
| WO | 0066940 A1 | 11/2000 |
| WO | 2015069376 A1 | 5/2015 |
| WO | 2016057023 A1 | 4/2016 |
| WO | 2016057024 A1 | 4/2016 |

OTHER PUBLICATIONS

International Search Report and Written Opinion regarding related PCT Application No. PCT/US2014/059398; dated Jun. 23, 2015; 12 pgs.
International Search Report and Written Opinion regarding related PCT Application No. PCT/US2014/059402; dated Sep. 9, 2015; 15 pgs.
International Search Report and Written Opinion regarding related PCT Application No. PCT/US2014/059405; dated Jun. 23, 2015; 11 pgs.
"Composite Material Technology"; pp. 225-245, published Oct. 1991.
Chinese Office Action re: Application No. 201480082576.5 dated May 7, 2019; 9 pages.

* cited by examiner

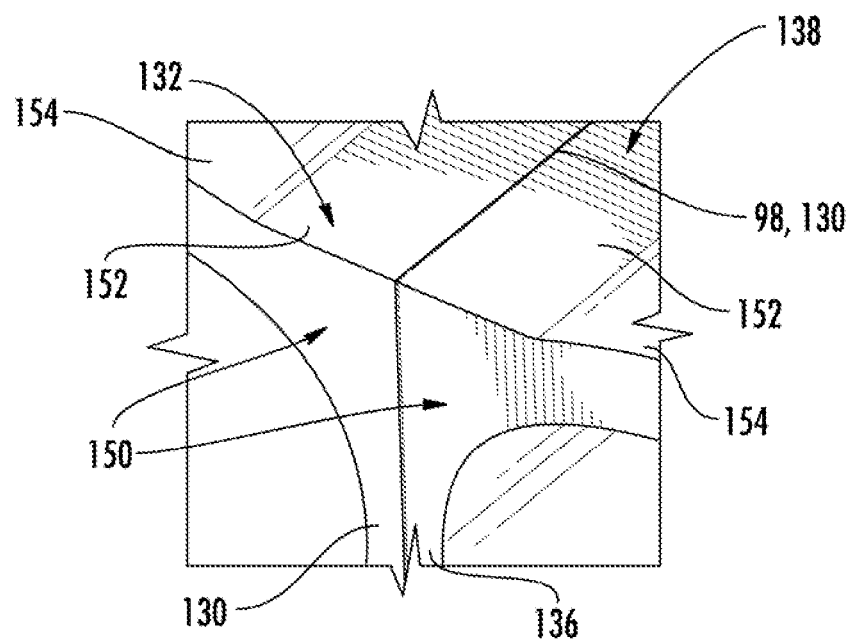
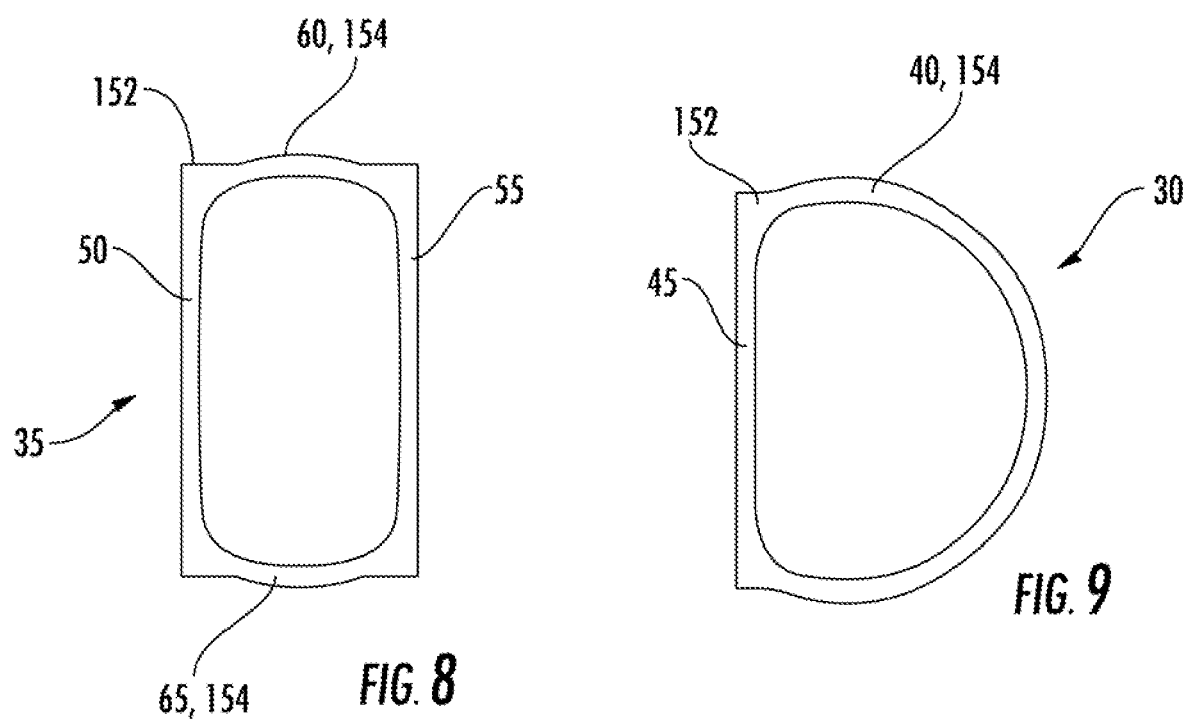

PRESSURE VESSEL ASSEMBLY AND METHOD OF FORMING

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

CROSS-REFERENCE TO RELATED APPLICATION

This patent application claims the benefit of priority to International Patent Application Serial No. PCT/US2014/059398, filed Oct. 7, 2014, which is incorporated herein by reference in its entirety.

BACKGROUND OF THE INVENTION

Exemplary embodiments of the invention generally relate to pressure vessel to be used for transport, storage, or utilization of a pressurized fluid, and more particularly, to an optimized pressure vessel having a high rate of conformity.

Pressure vessels are widely used to store liquids and gases under pressure. The storage capacity of a pressure vessel depends on the internal volume of the pressure vessel and the pressure that the vessel is capable of safely containing. In addition to its storage capacity, the size, internal shape, external shape, and weight of the pressure vessel are customized for a particular application.

One growing application of pressure vessels is the storage of compressed natural gas (CNG). Relatively large multi-lobed tanks for the transport or storage of pressurized fluid, including liquid or gas, exist. This basic technology may be extended to enable relatively inexpensive and commercially feasible fabrication of smaller tanks, which are capable of handling fluid under pressure. The current use of industry standard cylinders for CNG in automotive vehicles is limited because the gas volumetric density of a cylinder is low. A tank having enough natural gas to achieve a vehicle driving range comparable to conventional automobiles would be large and bulky and would require space that generally would be otherwise usable cargo space.

BRIEF DESCRIPTION OF THE INVENTION

According to one embodiment of the invention, a pressure vessel assembly includes a plurality of lobes, each of the lobes having at least one vertically arranged interior wall, the plurality of lobes being positioned in a side by side arrangement such that a first interior wall of a first lobe is positioned adjacent a second interior wall of a second lobe, the first interior wall having a first wall top side and a first wall bottom side, the second interior wall having a second wall top side and a second wall bottom side, the first wall top side is joined to the second wall top side and the first wall bottom side is joined to the second wall bottom side. Also included is a first end wall surface and a second end wall surface of each of the plurality of lobes. Further included is a plurality of end caps, each of the end caps joined to the end wall surfaces of the lobes, each of the end caps joined to at least one adjacent end cap.

In addition to one or more of the features described above, or as an alternative, further embodiments may include that the first and second interior walls are welded to each other, the end caps are welded to the end wall surfaces of the lobes, and the end caps are welded to each other.

In addition to one or more of the features described above, or as an alternative, further embodiments may include that the welded joints are solid-state welds.

In addition to one or more of the features described above, or as an alternative, further embodiments may include that the first wall top side, the First wall bottom side, the second wall top side and the second wall bottom side each are aligned parallel to a horizontal plane of the pressure vessel assembly and are disposed adjacent a curved wall portion of the lobes.

In addition to one or more of the features described above, or as an alternative, further embodiments may include a shoulder region located proximate the first wall top side, the first wall bottom side, the second wall top side and the second wall bottom side, wherein the shoulder region comprises a shoulder wall thickness greater than a wall thickness of the remainder of the lobes.

In addition to one or more of the features described above, or as an alternative, further embodiments may include that the pressure vessel assembly is configured to store compressed natural gas and is disposed in a vehicle.

According to another embodiment of the invention, a method of forming a pressure vessel assembly is provided. The method includes forming a plurality of lobes each extending in a longitudinal direction from a first end wall surface to a second end wall surface, each of the lobes having at least one vertically arranged interior wall, the plurality of lobes being positioned in a side by side arrangement such that a first interior wall of a first lobe is positioned adjacent a second interior wall of a second lobe, the first interior wall having a first wall top side and a first wall bottom side, the second interior wall having second wall top side and a second wall bottom side. The method also includes joining the first wall top side and the second wall top side. The method further includes joining the first wall bottom side and the second wall bottom side. The method yet further includes joining a plurality of end caps to the end all surfaces of the lobes.

In addition to one or more of the features described above, or as an alternative, further embodiments may include joining each of the end caps to an adjacent end cap.

In addition to one or more of the features described above, or as an alternative, further embodiments may include that joining the components comprises welding the first wall top side to the second wall top side, the first wall bottom side to the second wall bottom side, and the plurality of end caps to the end wall surfaces.

In addition to one or more of the features described above, or as an alternative, further embodiments may include heat treating the pressure vessel assembly prior to joining the components.

In addition to one or more of the features described above, or as an alternative, further embodiments may include heat treating the pressure vessel assembly subsequent to joining the components.

In addition to one or more of the features described above, or as an alternative, further embodiments may include that welding comprises at least one of flash upset butt welding, linear friction welding, fusion welding, capacitive discharge welding, and friction stir welding.

In addition to one or more of the features described above, or as an alternative, further embodiments may include that at least one jot is pried between the components with cold spraying.

In addition to one or more of the features described above, or as an alternative, further embodiments may include plastically deforming at least one component of the pressure vessel assembly subsequent to joining the components.

In addition to one or more of the features described above, or as an alternative, further embodiments may include inserting a weld adapter between adjacent components to be joined prior to welding the components to each other.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 is an enlarged perspective view of adjacent components disposed in contact with each other;

FIG. 8 is an end view of an interior lobe of the pressure vessel;

FIG. 9 is an end view of an end lobe of the pressure vessel;

The detailed description explains embodiments of the invention, together with advantages and features, by way of example with reference to the drawings.

DETAILED DESCRIPTION OF THE INVENTION

Figure 1:
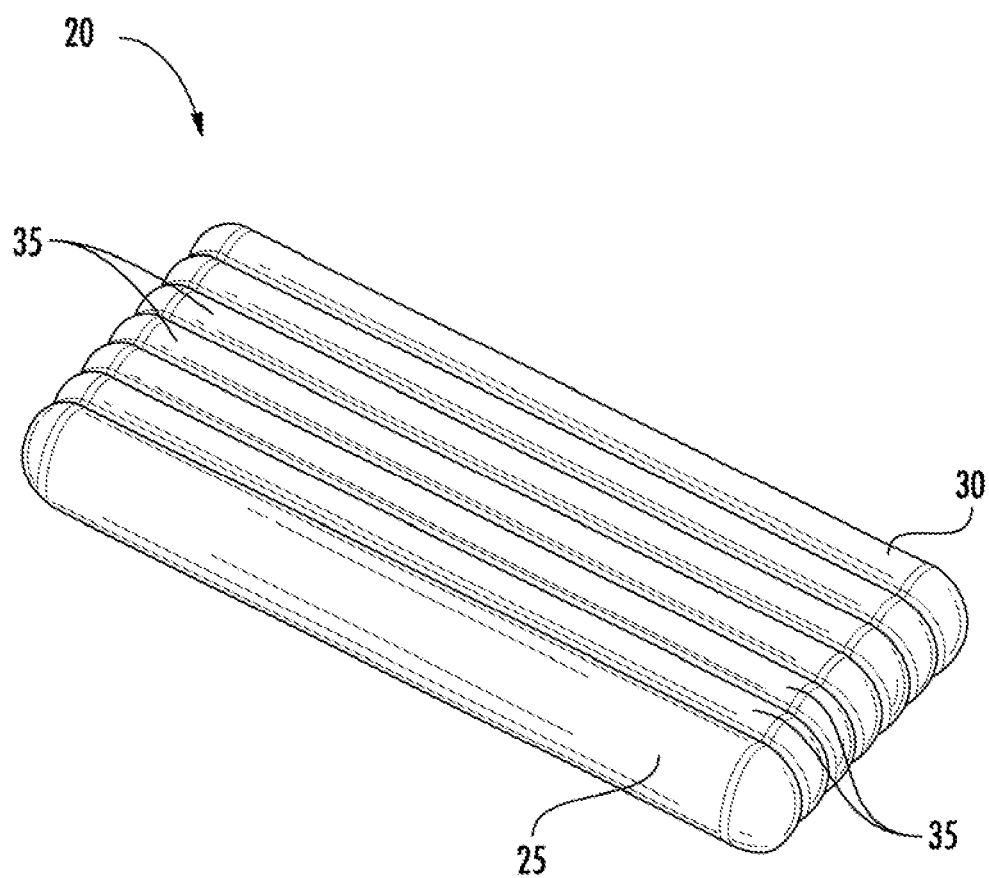
FIG. 1 is a perspective view of a pressure vessel configured to store a pressurized fluid according to an embodiment of the invention.

Referring now to FIG. 1, an example of a pressure vessel or tank 20 configured to store a pressure fluid, including liquid or gas, is illustrated. Exemplary fluids or gases that may be stored within the pressure vessel 20 include, but are not limited to, compressed natural gas (CNG), hydrogen, propane, methane, air, and hydraulic fluid, for example. The pressure vessel 20 includes a plurality of generally cylindrical lobes including a left end lobe 25 and a right end lobe 30. In the illustrated, non-limiting embodiment, the pressure vessel 20 additionally includes a plurality of substantially identical interior lobes 35, such as five interior lobes 35 for example; however a pressure vessel 20 having any number of interior lobes 35 is within the scope of the invention. The left end lobe 25, one or more interior lobes 35, and the right end lobe 30 are positioned side by side and are joined together by a plurality of bonds (see FIG. 3). As a result of this arrangement, the overall configuration of the pressure vessel 20 is generally rectangular in shape.

Figure 2:
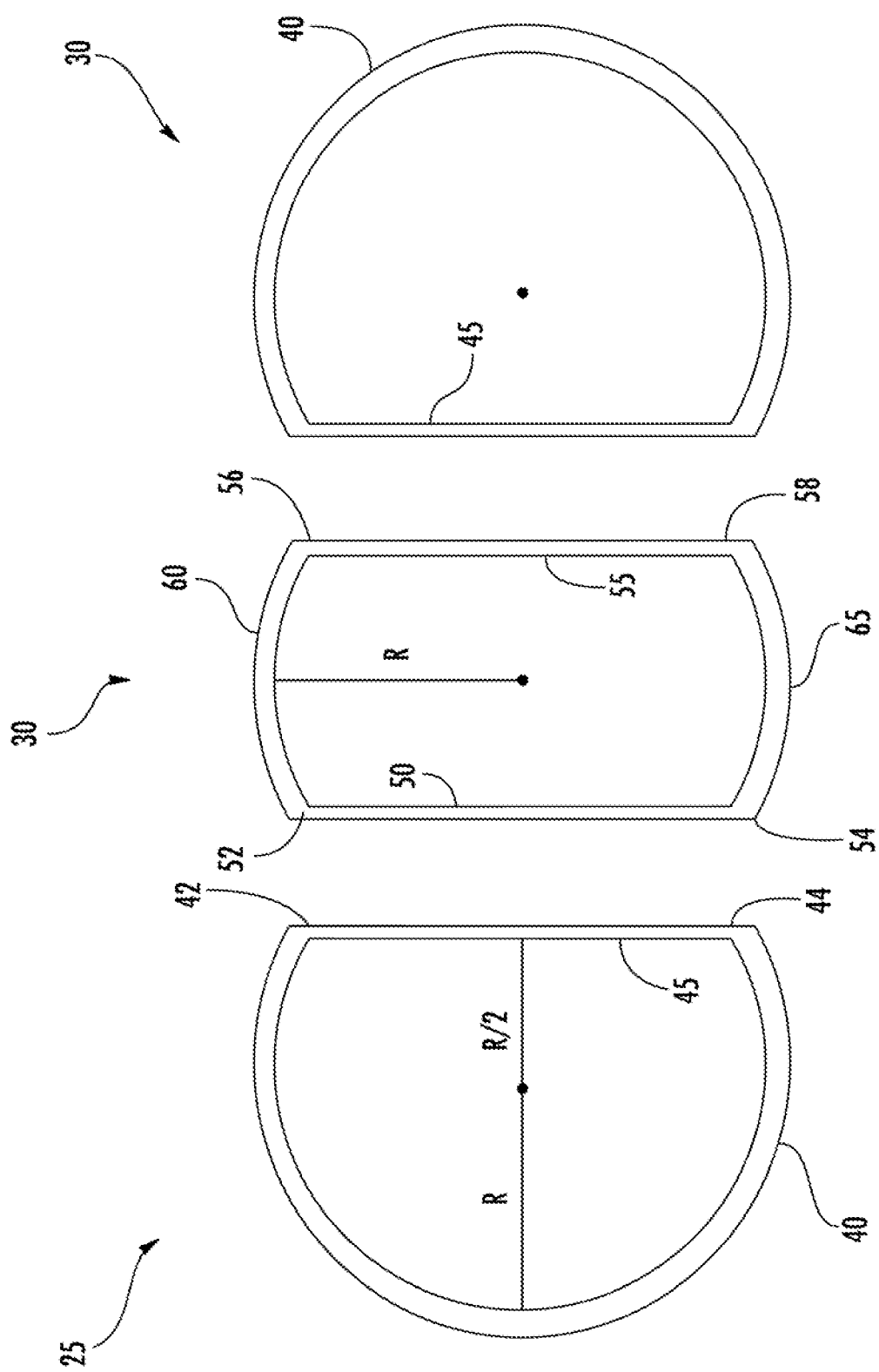
FIG. 2 is a disassembled end view of a portion of an embodiment of the pressure vessel.

Referring now to FIG. 2, the individual lobes 25, 30, 35 of the pressure vessel 20 are provided in more detail. The left end lobe 25 and the right end lobe 30 are substantially identical and are arranged such that the right end lobe 30 is rotated 180 degrees relative to the left end lobe 25, or are arranged as a mirror image of one another. The end lobes 25, 30 include a generally cylindrical outer wall 40 having a first thickness. An interior wall 45 extends generally vertically between a first end 42 and a second end 44 of the cylindrical outer wall 40 and has a thickness equal to half that of the outer wall 40. In one embodiment, the interior wall 45 is integrally formed with the ends 42, 44 of the cylindrical outer wall 40. At least a portion of the curvature of the cylindrical outer wall 40 is defined by a radius R. In one embodiment, the portion of the outer wall 40, opposite the interior wall 45, includes a circular shape or curve generally of a 240 degree angle as defined by the radius R. Consequently, the overall height of the end lobes 25, 30 is equal to double the length of the radius R of the cylindrical outer wall 40. The vertical interior wall 45 is generally parallel to and spaced apart from a vertical plane P that includes the origin of the radius R that defines the curvature of the outer wall 40. In one embodiment, the distance between the interior wall 45 and the parallel vertical plane P is about half the length of the radius R. As a result, the end lobes 25, 30 generally have a width equal to about one and a half the length of the radius of curvature R of the outer wall 40.

The illustrated interior lobe 35 includes a vertically arranged first interior sidewall 50 and second interior sidewall 55, separated from one another by a distance. In one embodiment, the width of the interior lobe 35 is generally equal to the radius of curvature R of the end lobes 25, 30. The thicknesses of the first interior sidewall 50 and the second interior sidewall 55 are identical and equal to the thickness of the interior wall 45 of the end lobes 25, 30. A first outside wall 60 extends between a first end 52 of the first interior sidewall 50 and a first end 56 of the second interior sidewall 55. Similarly, a second outside wall 65 extends between a second end 54 of the first interior sidewall 50 and a second end 58 of the second interior sidewall 55. The thickness of the first and second outside walls 60, 65 is substantially identical to the thickness of the curved outer wall 40 of the end lobes 25, 30. In one embodiment, the plurality of interior walls 50, 55 and the plurality of outside walls 60, 65 are integrally formed.

The curvature of the first outside wall 60 and the second Outside wall 65 may be defined by a circular shape or curve generally of a 60 degree angle by a radius R. In one embodiment, the radius of curvature R of the interior lobe 35 is substantially identical to the radius of curvature R of the end lobes 25, 30. Consequently, the distance between the first curved wall 60 and the second curved wall 65 is double the length of the radius of curvature R, and is therefore, substantially equal to the height of the end lobes 25, 30.

When the pressure vessel 20 is assembled, each interior wall 45, 50, 55 is positioned directly adjacent another interior wall 45, 50, 55. For example, in a pressure vessel 20 not having any interior lobes 35, the interior wall 45 of the left end lobe 25 is arranged next to the interior wall 45 of the right end lobe 30. In a pressure vessel 20 having a single interior lobe 35, the first interior sidewall 50 abuts the interior wall 45 of the left end lobe 25 and the second interior sidewall 55 abuts the interior wall 45 of the right end lobe 30. In embodiments including a plurality of interior lobes 35, the second interior sidewall 55 of at least one of the interior lobes 35 is arranged next to a first interior sidewall 50 of an adjacent interior lobe 35. The distance between the origin of the radius of curvature R of an interior lobe and the origin of the radius of curvature R an adjacent lobe, either an end lobe 25, 30 or another interior lobe 35, is generally equal to the length of the radius of curvature R. In addition, the overall width of the pressure vessel 20 is generally equal to the sum of three and the total number of interior lobes 35 multiplied by the length of the radius of curvature R.

Figure 3:
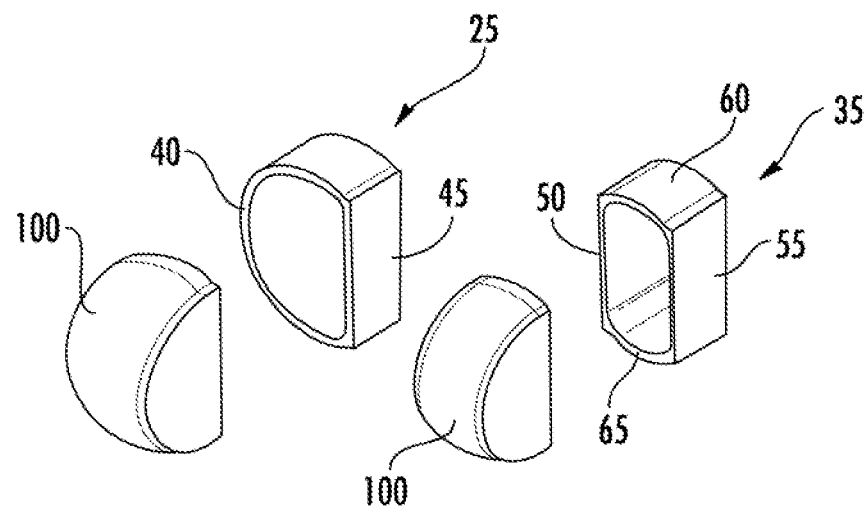
FIG. 3 is a disassembled perspective view of an end region of the pressure vessel.
Figure 4:
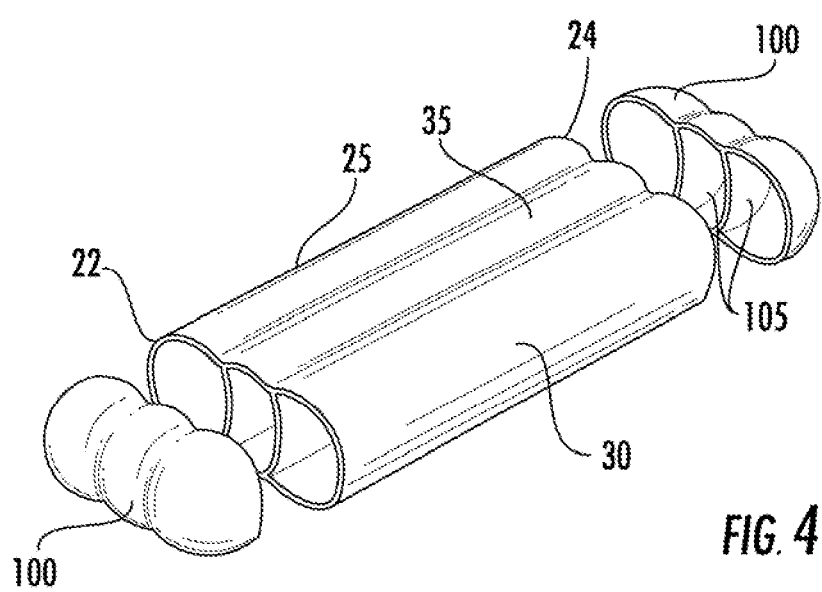
FIG. 4 is a disassembled perspective view of a pressure vessel.
Figure 5:
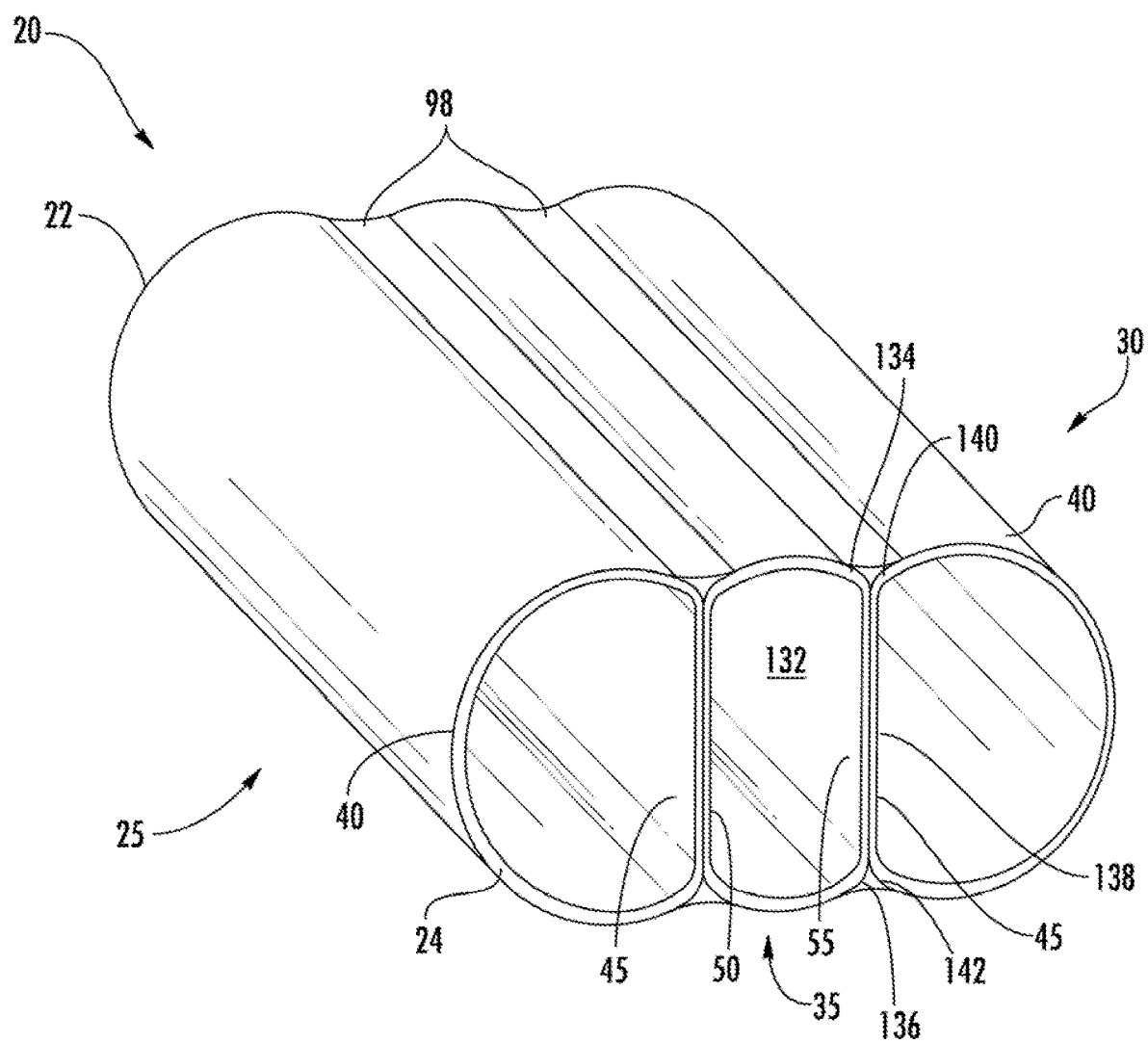
FIG. 5 is a perspective view of a portion of an embodiment of the pressure vessel.

Referring now to FIGS. 3 and 4, an end cap 100 is mounted, such as with a flash butt weld for example, at both a first end wall surface 22 and a second end wall surface 24 located opposite the first end wall surface 22 of each of the plurality of lobes 25, 30, 35 of the pressure vessel 20. The plurality of end caps 100 joined to an end 22, 24 of each of the lobes 25, 30 35, may be separate (FIG. 4) or may be integrally formed (FIG. 5). In embodiments where the end caps 100 are integrally formed, the end caps 100 include an internal support 105 generally aligned with each adjacent interior wall 45, 50, 55 of the pressure vessel 20. Each end cap 100 has a shape substantially complementary to the shape of the adjacent lobe 25, 30, 35 of the pressure vessel 20. In one embodiment, each end cap 100 includes a portion of a sphere having a radius equal to the radius of curvature R. As a result, the end caps 100 configured to couple to the end lobes 25, 30 include a greater portion of a sphere than the end cap(s) 100 configured to couple to the interior lobes 35.

The lobes 25, 30, 35 of the pressure vessel 20 generally may be fabricated from a high strength metal or composite material. The end lobes 25, 30 and the interior lobes 35 may be formed by any of a number of manufacturing processes, including, bat not limited to, extrusion, forging, squeeze casting, roll forming, and laser forming for example. End caps 100 may be fabricated similarly from a high strength metal or composite material, and by a process including but not limited to stamping, forging, squeeze casting, impact extrusion, and machining for example. An embodiment of pressure vessel 20 may be fabricated from a composite by a process including, but not limited to, weaving, braiding, filament winding, ply layups for example. These processes may be used individually or in combination to fabricate individual or conjoined tubes to produce the final geometry. Additional and more specific embodiments of processes which may be employed to form the pressure vessel 20 and subcomponents thereof, as well as joining techniques of the subcomponents, are discussed in detail below.

Figure 6:
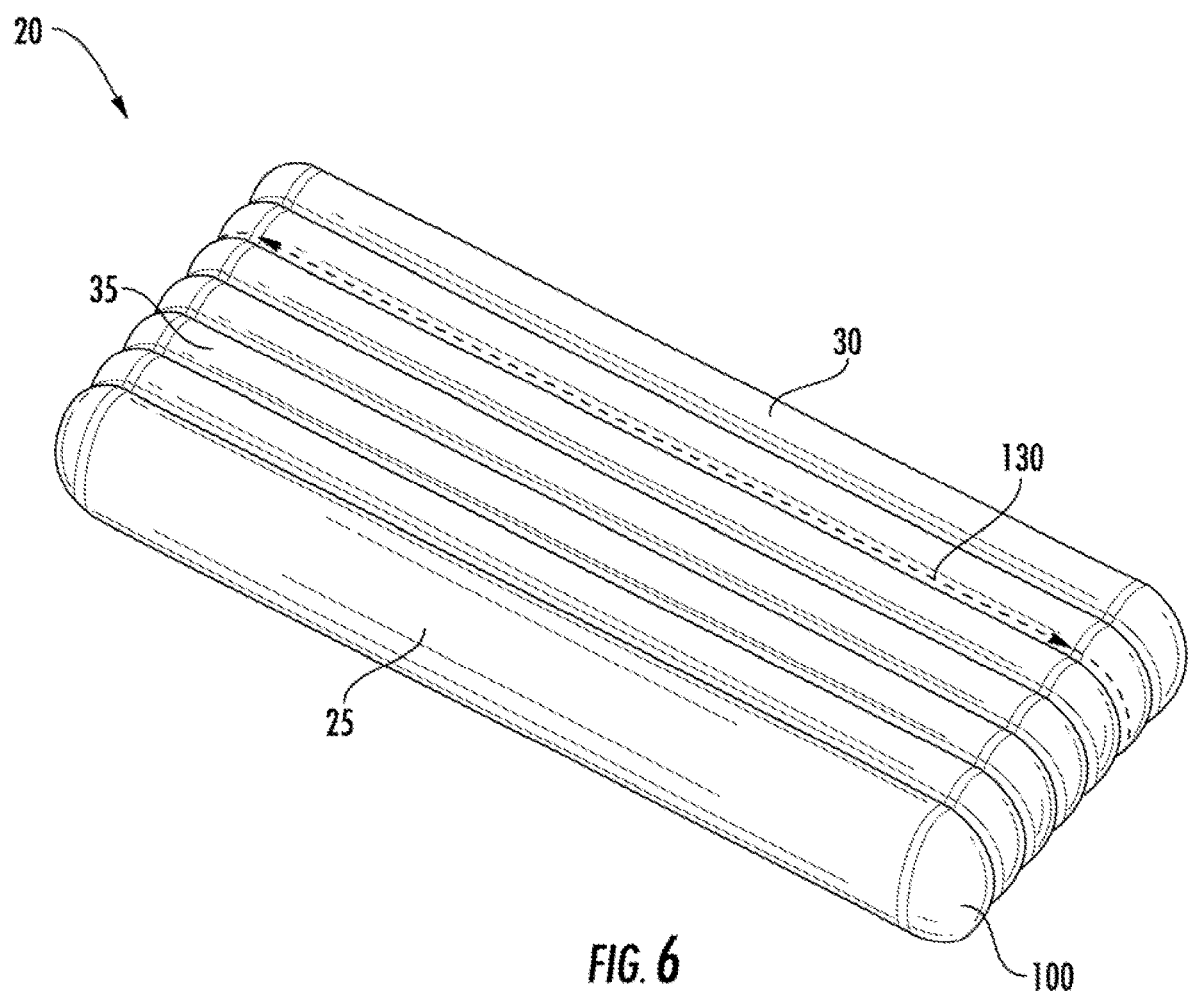
FIG. 6 is a perspective view of the pressure vessel illustrating a joint line of adjacent components.

Referring now to FIGS. 5 and 6, adjacent lobes 25, 30, 35 of the pressure vessel 20 are coupled with one or more bonds 98. The bonds 98 are configured to transmit the tensile load on the curved walls 40, 60, 65 between the plurality of lobes 25, 30, 35. The bonds 98 are sized to provide adequate strength and load path to allow a balanced load share between outer walls 40, 60, 65 with vertical interior walls 45, 50 and 55. Exemplary processes for fabricating these bonds 98 include, but are not limited to, fusion welding, such as arc laser or electron beam welding, solid state welding, such as Friction stir welding, linear friction welding, brazing, capacitive discharge welding and transient liquid phase bonding, for example, depending on the selected tank material. Additionally, a cold spraying process may be employed to join components of the pressure vessel 20. Some of these processes are particularly advantageous for use with certain alloys that the lobes 25, 30, 35 and/or end caps 100 are formed of in certain embodiments. In particular, materials that would benefit from the use of certain welding techniques described herein include high strength aluminum alloys, such as 2000 and 7000 series of alloys, steels, such as 4000 series, and pH and high strength 400 series stainless steels.

As shown with line 130, the bonds 98 extend along a length of the lobes 25, 30, 35 in contact with each other. The bonds 98 may be formed along an entire length of the lobes or intermittently along the length. As illustrated, the bonds 98 extend along a top side of the interior walls 45, 50 of the lobes. Similarly, the bonds 98 are formed along a bottom side of the interior walls 45, 50 of the lobes. For example, a first interior wall 132 includes a first wall top side 134 and a first wall bottom side 136. Similarly, a second interior wall 138 located adjacent the first interior wall 132 includes a second top side wall 140 and a second bottom side wall 142. The first wall top side 134 is joined to the second wall top side 140 and the first wall bottom side 136 is joined to the second wall bottom side 142.

Referring to FIGS. 7-9, along the regions to be joined (i.e., proximate the top and bottom sides of the interior walls), a shoulder region 150 is formed to facilitate a more efficient welding, particularly for solid state welding techniques. The shoulder region 150 includes a flat, upper surface 152 of the top and bottom wall surfaces of the interior walls that is substantially parallel to a horizontal plane of the pressure vessel 20. The flat, upper surface 152 transitions to a curved portion 154 that is part of the curved walls 40, 60, 65 of the lobes 25, 30, 35. The shoulder region 150 forms a shoulder wall thickness that is greater than the remainder of the lobe wall thickness. The shoulder region 150 provides partial wall penetration by the weld to avoid through wall welds and weld interface cracking or notch formation at the inner diameter of the lobe walls. Additionally, the shoulder region 150 allows for machining after welding providing optimal stress distribution.

As noted above, the end caps 100 may be integrally formed in a side-by-side configuration and joined to the end suffices 22, 24 of the lobes 25, 30, 35. Alternatively, the end caps 100 may be separately formed and joined together with any of the above-described joining techniques. In embodiments having separately formed end caps 100 that require joining to each other, the shoulder region 150 described above may be included along the portions of the end caps 100 that are to be joined. As with the lobes, the shoulder region 150 of the end caps extends in a longitudinal direction of the overall pressure vessel 20. The joining techniques and advantages thereof are described above.

Figure 10:
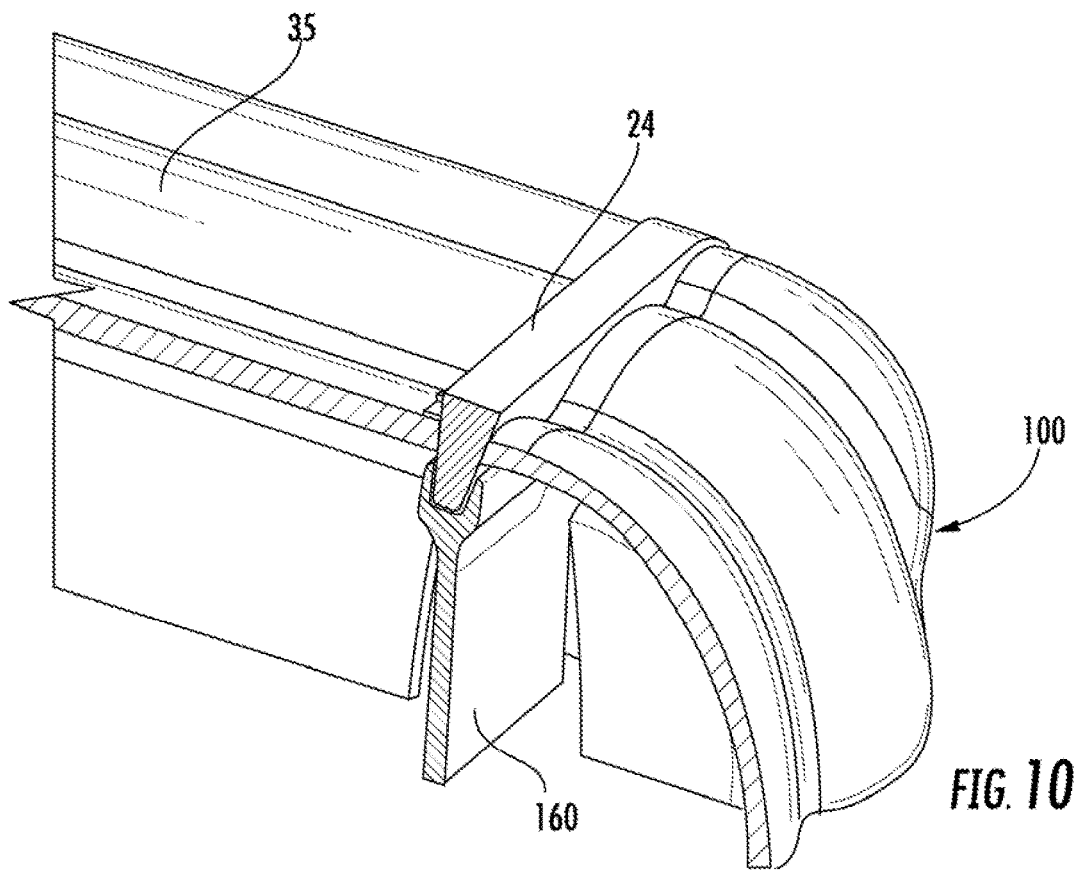
FIG. 10 is a perspective view of a lobe of the pressure vessel being joined to an end cap of the pressure vessel with a weld adapter.

The end caps 100 are joined to the end surfaces 22, 24 with any of the above-described techniques. In one embodiment, the joining technique(s) facilitates efficient joining of each end cap 100 to the end surfaces 22, 24 about an entire surface of the end surfaces 22, 24. However, it is contemplated that the end caps 100 are joined to the end surfaces 22, 24 along only portions of the end surfaces 22, 24. During joining of the end caps 100 to the end surfaces 22, 24, a weld adapter 160 may be disposed between the components, as shown in FIG. 10. Numerous welding techniques may benefit from the use of the weld adapter 160 based on the provision of easier weld paths and support for the high loads generated during welding processes, such as friction stir welding and butt welding, for example.

Figure 11:
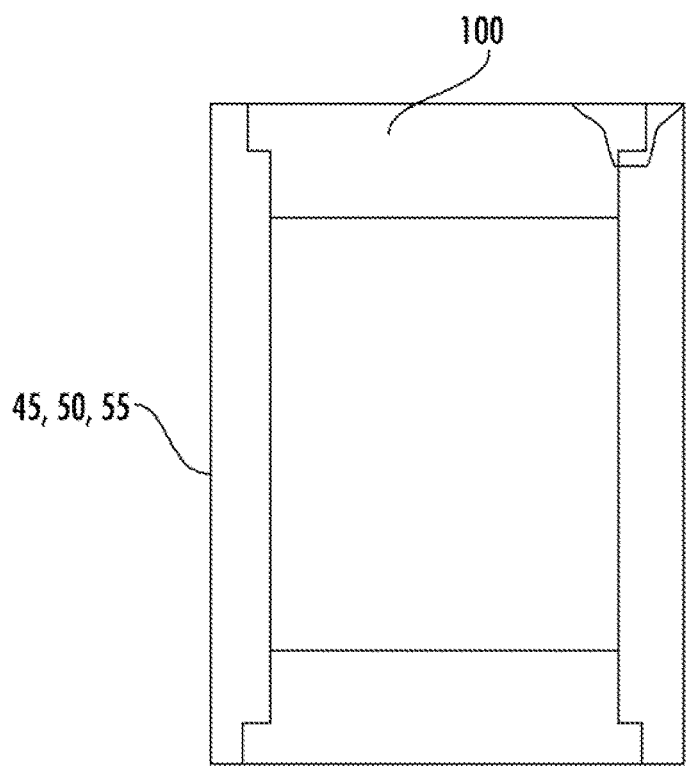
FIG. 11 is an end view of the pressure vessel according to an embodiment.

Referring to FIG. 11, an embodiment of the end caps 100 is illustrated. The illustrated embodiment shows a cross-section of the portion of an end cap 100 joined to the lobes. The portion of the end cap 100 that is directly joined to the lobe(s) is substantially flat and does not include curved regions. The curved regions of the end caps 100 are located away from the joining interface. The flat joining interface improves stress distribution and facilitates solid state welding at the interface. Illustrated is just one representative geometry and it is to be appreciated that any geometry may be included to locate the end cap 100 to the lobe(s) and join it thereto.

It is to be appreciated that any of the joining techniques described herein may be utilized solely to join the components of the pressure vessel 20 or a combination of the techniques may be employed. Various post-weld processes may be performed. For example, subsequent to practicing the joining processes described above, an infiltration of un-welded partial interfaces may be performed with adhesives and/or brazes to reduce stress risers. Additionally, composite adhesive surface patches may be included to distribute stress and reinforce the welds. Furthermore, post-weld treatments that plastically deform the weld zone may be employed to improve the stress state and to work harden the alloy.

Heat treatments of the pressure vessel 20 may be performed prior to joining the components to stabilize the mechanical properties of the components. A post-joining heat treatment may be applied alone or in combination with the pre-joining heat treatment. The post-joining heat treatment optimizes the mechanical properties of the components. A two-step heat treatment (pre-joining and post-joining) process may be particularly beneficial for certain alloys, such as 2000 and 7000 series alloys. Additionally, cooling may be performed during certain joining techniques, such as during friction stir welding to enhance the mechanical properties of the components.

In one exemplary embodiment, the process of forming the pressure vessel 20 includes forming the lobes 25, 30, 35. Formation may be achieved by extruding and straightening the lobes. The end caps 100 are forged and machined to a desired shape. The end caps 100 are then joined individually joined to the end surfaces 22, 24 of separated lobes, such as by flash upset butt welding. The individual lobes 100 are then joined to each other, such as by friction stir welding. A heat treatment is then applied to boost strength and to relieve stress.

The pressure vessel 20 has a significantly higher conformability (ratio of volume of pressurized fluid that can be stored within the pressure vessel to the equivalent rectangular envelope) than conventional pressure vessels for storing a pressurized fluid. The high conformability of the pressure vessel 20 is a result of the geometry, which has been optimized to share the loads and minimize the peak stresses, such as hoop stress for example, on the interior and outer walls 40, 45, 50, 55, 60, 65 of the conjoined lobes 25, 30, 35 under internal pressure. The pressure vessel 20 advantageously is more easily fit within various storage areas, such as vehicles, for example. Additionally, the joining processes described herein provide joints that minimize material strength loss during joining and stress concentrations to provide robust weld joints under long term fatigue loading for the life of an application of the pressure vessel 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A pressure vessel assembly comprising:
a first lobe being circumferentially continuous, and including a first interior wall, a first outer wall, and a first shoulder region joined to and disposed between the first interior wall and the first outer wall, wherein the first shoulder region includes a thickness that is greater than a remainder of the first lobe; and
a second lobe being circumferentially continuous, and including a second interior wall, a second outer wall, and a second shoulder region joined to and disposed between the second interior wall and the second outer wall, wherein second shoulder region includes a thickness that is greater than a remainder of the second lobe, the first interior wall is positioned adjacent to the second interior wall, and the first shoulder region is positioned adjacent to the second shoulder region,
wherein the first and second shoulder regions each include an outer surface that transitions into respective curved portions of the respective first and second outer walls.
2. A pressure vessel assembly comprising:
a first lobe being circumferentially continuous, and including a first interior wall, a first outer wall, and a first shoulder region joined to and disposed between the first interior wall and the first outer wall, wherein the first shoulder region includes a thickness that is greater than a remainder of the first lobe;
a second lobe being circumferentially continuous, and including a second interior wall, a second outer wall, and a second shoulder region joined to and disposed between the second interior wall and the second outer wall, wherein second shoulder region includes a thickness that is greater than a remainder of the second lobe, the first interior wall is positioned adjacent to the second interior wall, and the first shoulder region is positioned adjacent to the second shoulder region; and
a weld adapted to join the first and second shoulder regions.

* * * * *